H. A. WITT.
APPARATUS FOR INTEGRATING VARIABLE QUANTITIES AS REGARDS THE TIME.
APPLICATION FILED MAY 21, 1918.

1,432,375.

Patented Oct. 17, 1922.

Inventor.
H. A. Witt.
By L. R. Kerslake
Atty.

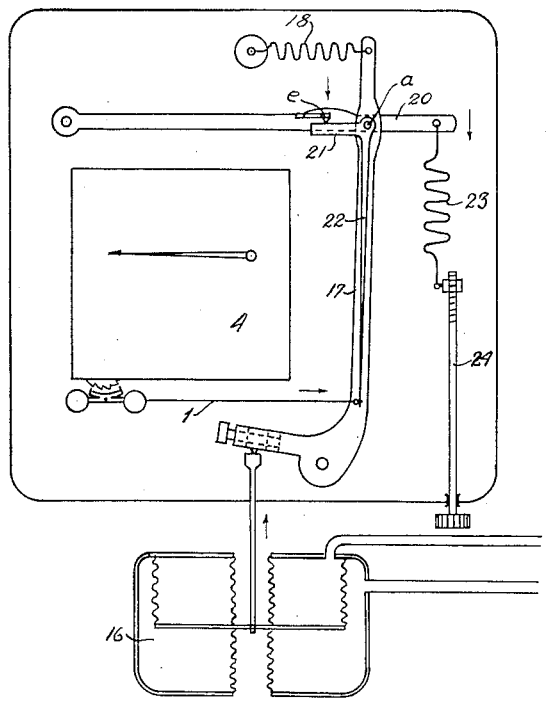
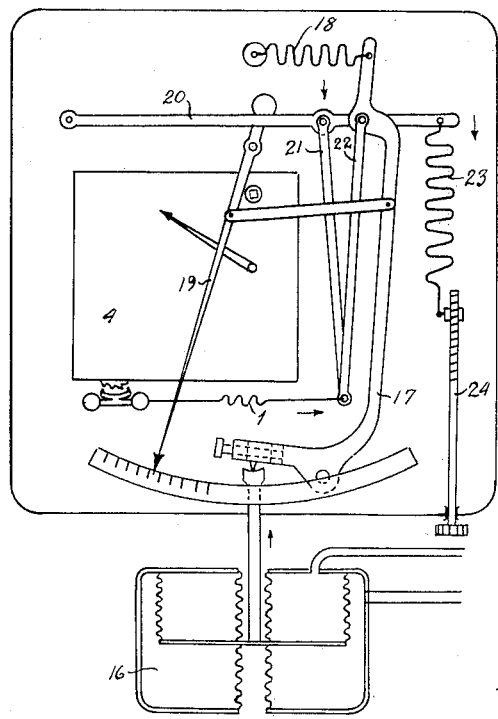

H. A. WITT.
APPARATUS FOR INTEGRATING VARIABLE QUANTITIES AS REGARDS THE TIME.
APPLICATION FILED MAY 21, 1918.

1,432,375.

Patented Oct. 17, 1922.
7 SHEETS—SHEET 5.

Inventor.
H. A. Witt.
By H. R. Kerslake
Atty.

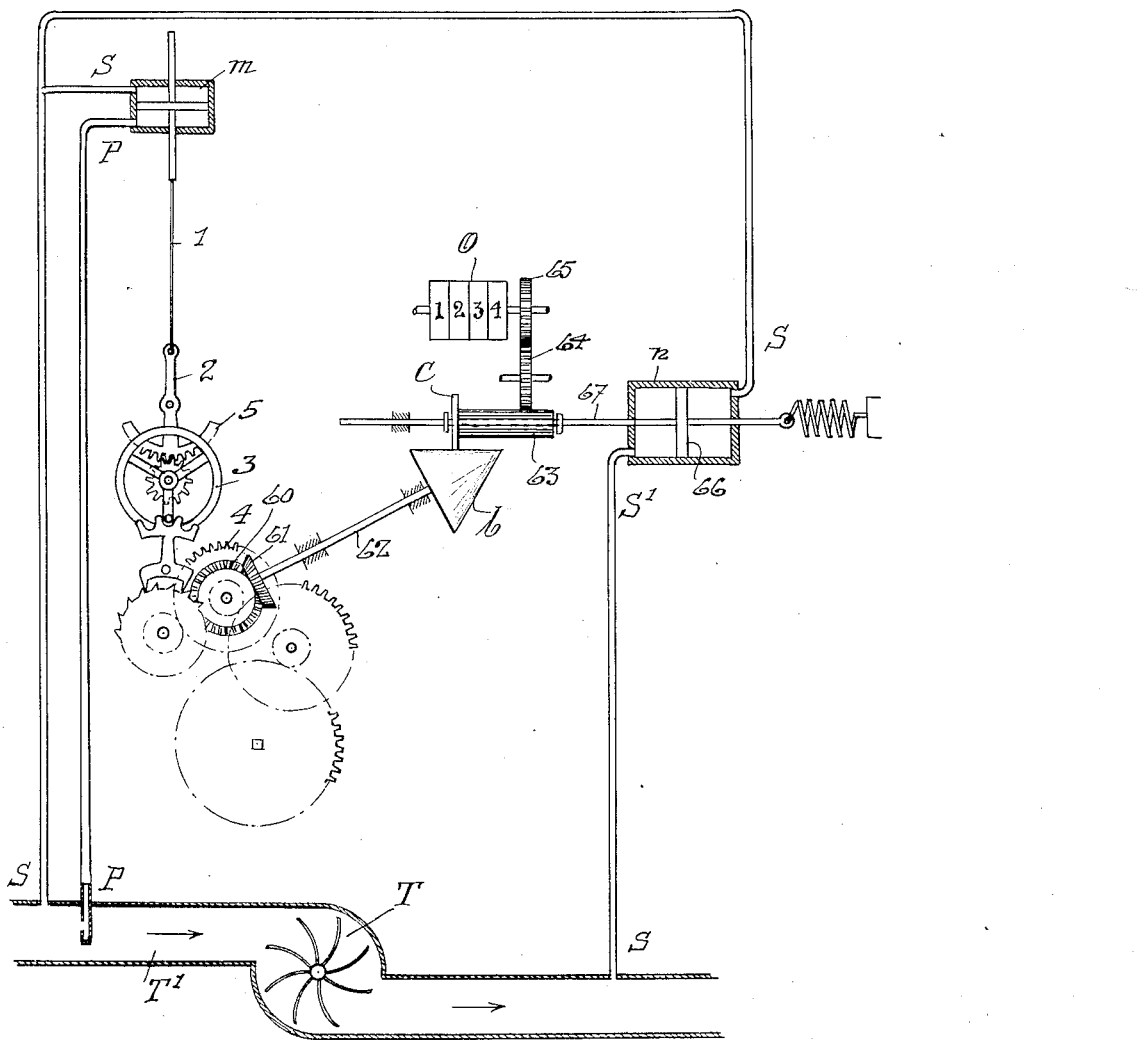

H. A. WITT.
APPARATUS FOR INTEGRATING VARIABLE QUANTITIES AS REGARDS THE TIME.
APPLICATION FILED MAY 21, 1918.

1,432,375.

Patented Oct. 17, 1922.

Inventor
H. A. Witt.
By H. R. Kerslake
Atty.

Patented Oct. 17, 1922.

1,432,375

UNITED STATES PATENT OFFICE.

HUGO ADAM WITT, OF STOCKHOLM, SWEDEN.

APPARATUS FOR INTEGRATING VARIABLE QUANTITIES AS REGARDS THE TIME.

Application filed May 21, 1918. Serial No. 235,818.

*To all whom it may concern:*

Be it known that I, HUGO ADAM WITT, a subject of the King of Sweden, and residing at 29 Tulegatan, Stockholm, Sweden, have invented certain new and useful Improvements in Apparatus for Integrating Variable Quantities as Regards the Time, of which the following is a specification.

For the purpose of integrating variable quantities as regards time, the inserting of a variable gearing between a clock work running at a constant speed and a counter has been the most common arrangement. This variable gearing is made to operate in such a way that the ratio of gearing between the clock work and the counter is kept proportionate to the variable quantity which is to be integrated as regards time. If for example the speed indicated by a speed indicator should be integrated as regards time in order to obtain the distance traveled, the ratio of gearing must be kept proportionate to the speed in every moment.

In many cases it is, however, desired to obtain the time integral of the square root of a variable quantity. Such is the case with hydrostatic logs where the pressure created by the speed is proportionate to the square of the speed. In order to obtain the distance traveled it will thus be necessary to integrate the square root of the "speed pressure" as regards time.

My present invention has for its object to arrange a clock in such a manner that it can directly either integrate the square root of a variable quantity or this quantity itself as regards time.

In each clockwork there must be provided a force which tends to bring the oscillating member (pendulum, balance, a mass located on the helical spring and oscillating up and down or the like) back to its position of equilibrium (rest). This force is delivered either by the weight of a pendulum or by a spring connected with the oscillating mass. The magnitude of this force must be proportionate to the distance of the oscillating body from its position of equilibrium, if the period of oscillation shall be independent of the magnitude of the deviation. The time of a single oscillation of an oscillating body is:

$$T = \pi \sqrt{\frac{K}{C}}$$

(See O. D. Chowlson, Lehrbuch der Physik, 1902, erster Band, page 361)

Where $K$ is the moment of inertia of the oscillating body with regard to the point of suspension, and $C$ is a quantity which is so determined that the pair of forces (turning moment, tending to bring the oscillating body back to its position of equilibrium is $C\phi$ where $\phi$ is the angular distance of the oscillating body from the position of equilibrium. This formula is also applicable to a rectilinear oscillating mass, if $K$ designates the mass and the quantity $C$ is determined in such a manner that the force tending to bring it back to the position of equilibrium is $=C\alpha$, where $\alpha$ is the linear distance of the mass from the position of equilibrium. The quantity $C$ is called the turning moment or the force tending to bring back the mass divided by the deflection. If now the oscillating body is oscillating under the influence of a turning moment or of a force which is in every moment proportionate to the quantity $G$ to be integrated as regards the time, and if $C$ is assumed to be $=c.G$, where $c$ is a constant, the time of an oscillation will be:

$$T = \pi \sqrt{\frac{K}{c.G}}$$

In a time interval $dz$ the number of oscillations is $dz/T$, and as the hand of the clock indicates the number of oscillations (or a number proportionate therewith), the hand will in the time $dz$ indicate a number of units $=dz/T$ or, if the value of T is inserted, $$\frac{dz}{\pi}\sqrt{\frac{c.G}{K}}$$

This quantity is proportionate to the time, proportionate to the square root of the quantity to be integrated as regards the time, and inversely proportionate to the square root of the moment of inertia (mass). During a time Z the hand will indicate the sum:

$$\int_0^z \frac{dz}{\pi}\sqrt{\frac{cG}{K}}$$

If all the constant quantities are placed before the sign of summation, one obtains:

$$\frac{1}{\pi}\sqrt{\frac{c}{K}}\int_0^z \sqrt{G}\,dz$$

this quantity being proportionate to the desired time integral of the square root of the quantity G. By using a convenient gearing and a convenient dial scale one can easily have the clock hand indicate the desired integral in suitable units.

In order to obtain the time integral of the quantity G itself, the force (turning moment) tending to bring the pendulum, the balance, or other oscillating body back to the position of equilibrium is in a similar manner made proportionate to the square of the quantity which is to be integrated as regards time.

Amongst other cases, occuring in practice, where it may be advantageous to integrate the square root of a variable quantity as regards time, the following can be mentioned viz:

Wind motors either based upon the principle of Pitot's tube or upon the pressure of the wind against a surface, Distance recorders for airships based upon the measuring of the wind, Steam or gasmeters based upon the Pitot's tube principle or upon the measuring of the difference in pressure on both sides of a throttle in a steam or gas conduit.

Water meters of the Pitot or Venturi principles.

The annexed drawings show some forms of embodiment according to this invention.

Figure 5:
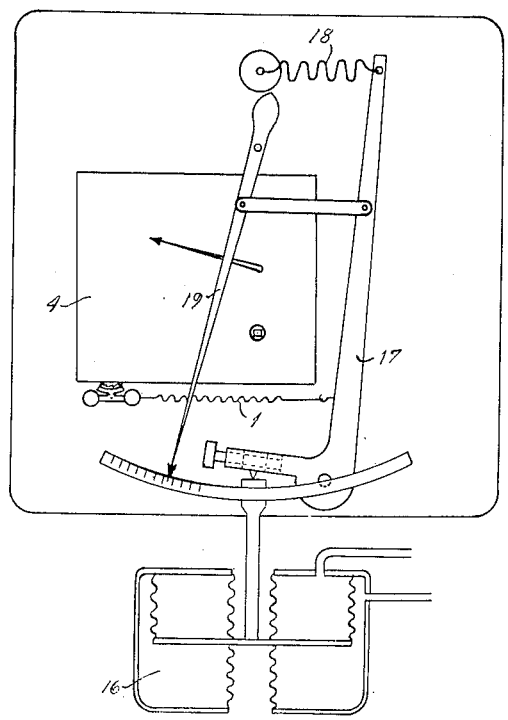
Fig. 5 shows a hydrostatic log provided with an arrangement for time integration of the square root of the speed pressure, in order to obtain the distance traveled.

Figs. 6 and 6$^a$ are diagrammtic views of modifications of the arrangement shown in Fig. 5.

Figure 7:
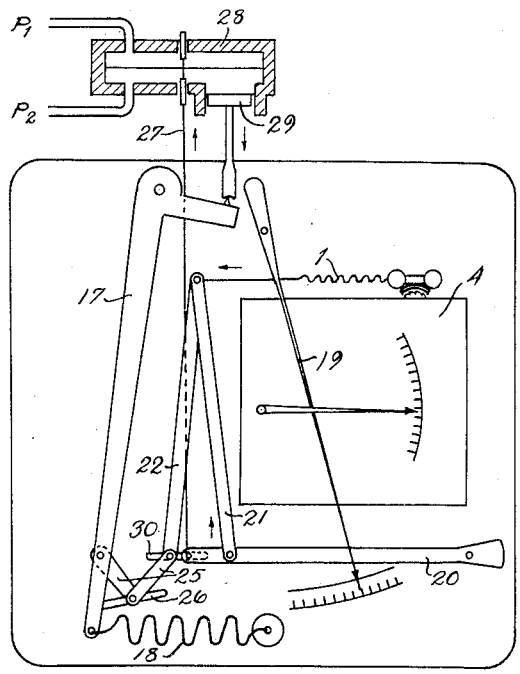

Fig. 7 is a diagrammatic view of an arrangement for use in a steam meter.

Figure 8:
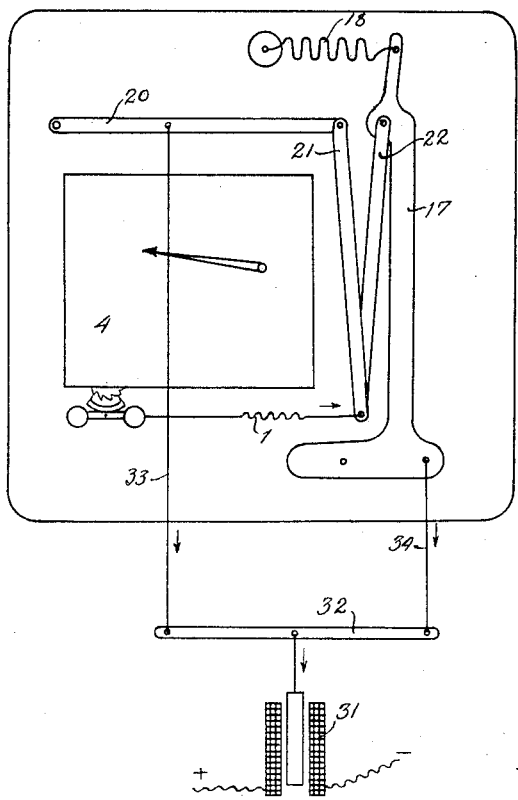

Fig. 8 is a similar view of a device for time integration of a certain quantity, for instance, the force exerted in any way.

Fig. 8$^a$ is a view partly in section and partly diagrammatic of a device for testing turbines.

Figure 9:
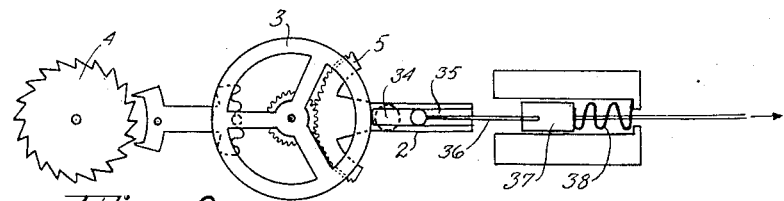
Figure 10:
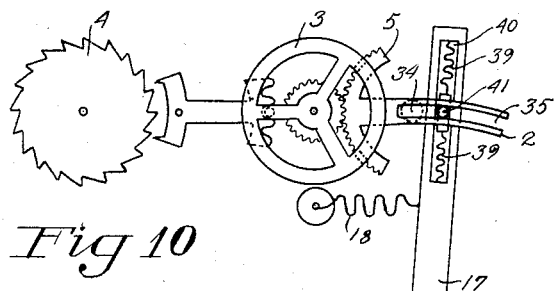
Figure 11:
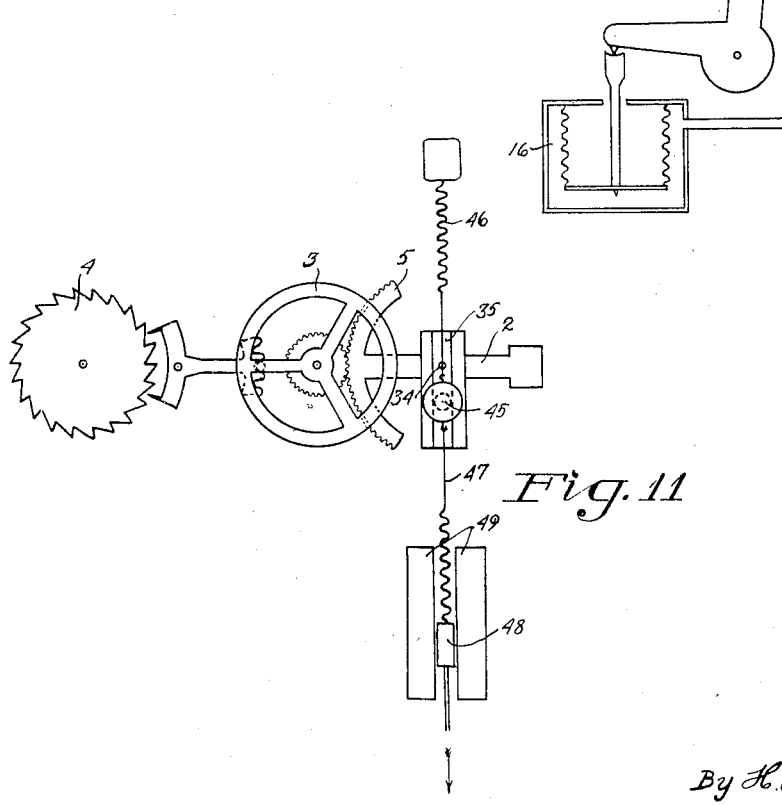

Figs. 9, 10 and 11 are diagrammatic views of modifications.

Figure 1:
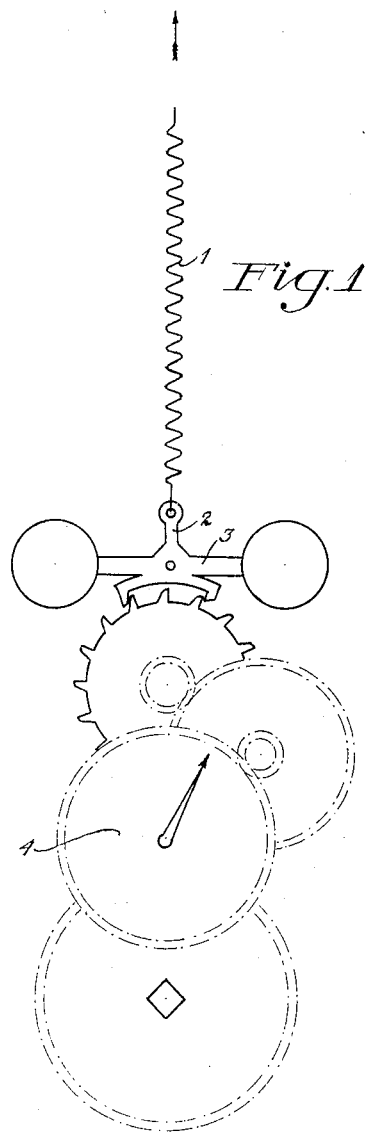
Fig. 1 is a diagrammatic view of a clock work mechanism constructed to integrate the square root of a variable force as regards time.

Fig. 1 shows a clock work arranged to integrate square root of a variable force as regards the time. The force in question acts either directly or in a certain ratio upon a member of tension 1, affecting a lever 2 connected with a balance or balance wheel of a clock work the hand of which will indicate the desired integral. Obviously, a member of compression can be used instead of one of tension. To equalize smaller variations of the tension or compression, the transmitting member can, if desired, be made elastic.

Figure 2:
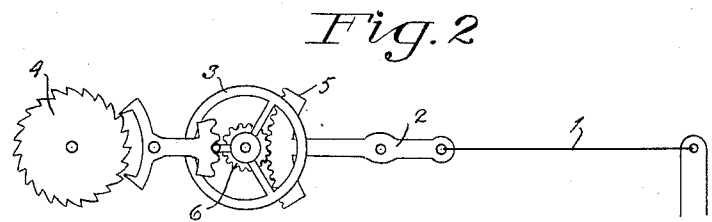
Fig. 2 is a similar view of a modification.

According to Fig. 2 the transmitting member is not directly attached to the balance 3, but to the lever 2 of a toothed segment 5, gearing into a toothed wheel 6 fixed to the axle of the balance wheel. Instead of a toothed segment and wheel any other gearing can be used for example friction gearing, belt and pulley drive, etc.

Figure 3:
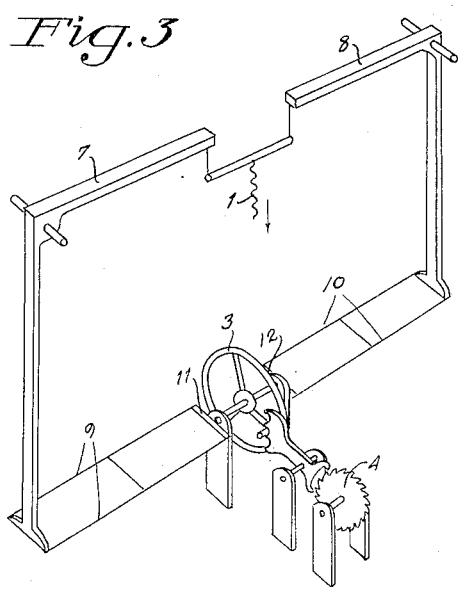
Fig. 3 is a perspective view of another arrangement.

According to Fig. 3, the tension member 1 acts on one end of two angle levers 7 and 8, respectively, the opposite ends of which are connected to connecting devices such as bands 9 and 10, respectively, acting on cross levers 11, 12 attached to the axis of the balance. If the member 1 be stretched, the bands 9, 10 which have been twisted by the oscillation of the balance tend to adjust themselves in a plane by means of a force, the momentary increase of which is proportionate to the tension of the member 1. Thus, the bands tend to move the balance back to its position of equilibrium by means of the said force.

Figure 4:
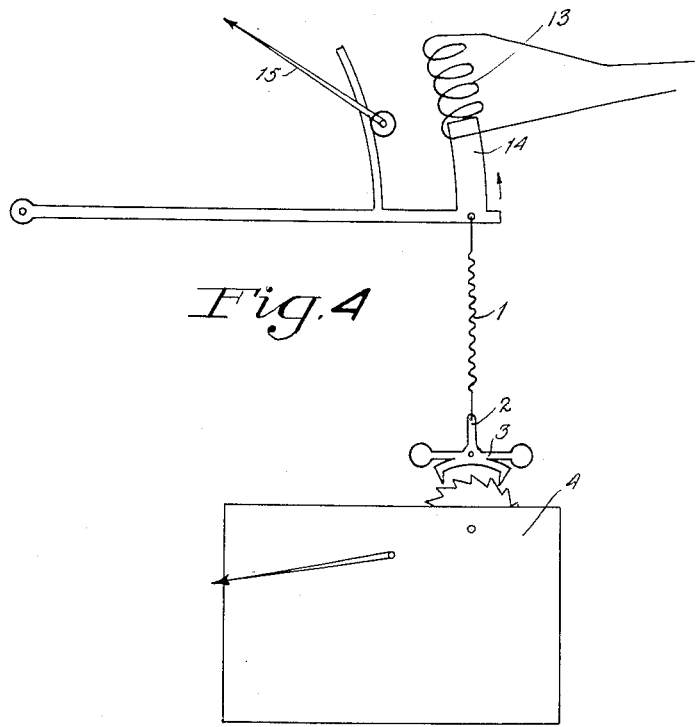
Fig. 4 is a diagrammatic view of a combination clock work mechanism and an electro-magnet arranged for time integration of the square root of the force.

Fig. 4 shows the combination of a clock work mechanism and an electro-magnet arranged for time integration of the square root of the force, in which the coil 13 attracts the core 14. A pointer 15, which is, by means of a gearing, in engagement with a toothed segment secured to the lever of the core 14, indicates the magnitude of the force. If, instead of the core 14, a solenoid is used, which is fed with the same current (or a branch thereof) as the winding 13, the tension member 1 will be attracted by a force proportionate to the square of the current.

The clock work mechanism will indicate the time integral of the current, i. e. the quantity of electricity.

In Fig. 5 is shown a hydrostatic log provided with an arrangement for time integration of the square root of the speed pressure, in order to obtain the distance traveled. By means of a pressure receiver, such as a pair of bellows 16, the speed pressure will be obtained and caused to act upon a lever 17, connected with a fixed point of the frame by means of a spring 18. The deflection of the lever acted upon by the spring will be proportionate to the speed pressure, and this pressure is indicated on a graduated scale by means of a pointer 19 secured to the lever 17. Obviously, the scale may also be graduated to show the speed directly. Secured to a point of the lever 17 is a spring 1 connecting the lever and the balance of the clock work mechanism 4 in such manner that the spring will not be stretched at the zero-postion of the pointer. When the pressure in the receiver 16 acts upon the lever 17, the spring 1 will be stretched by a force proportionate to the elongation of the spring, i. e. to the speed pressure. Thus, the running of the clock work mechanism will be proportionate to the square root of the speed pressure, i. e. to the speed of the ship, and the pointer of the clock work mechanism will indicate a value proportionate to the distance traveled, or, if the gearing be suitably chosen, the passed distance itself in usual units (kilometers, nautical miles).

Figs. 6 and 6ª show modifications of the above described arrangement. In these modifications, the lever 17 does not act directly upon the tension member 1, but through the levers 20, 21 and 22, respectively. The lever 20 has one of its ends connected with a point of the frame of the apparatus and is preferably balanced through a counterweight (not shown). The other free end of the lever 20 is acted upon by a constant force such as a spring 23, a weight or otherwise. If a spring be used, its tension may be adjusted by a screw 24.

According to Fig. 6, the lever 17 carries an angle lever 21, 22 pivoted at the point $a$. The arm 21 of the said angle lever is acted upon by the point $e$ of the lever 20. The arm 22 is secured to the tension member 1. The entire system is balanced to prevent the weight of the different parts from causing any turning moment. At the zero-position of the system the position of the edge $e$ will coincide with the axis of the journal $a$ and thus have no turning moment on the lever. When the lever 17 is deflected not only the distance $a$—$e$, i. e. the active length of the lever 21, but also the tension of the member 1 will be proportional to the speed pressure, and in consequence the running of the clock work mechanism will be proportionate to the speed of the ship.

According to Fig. 6ª, two links 21 and 22, respectively, are substituted for the angle lever. One end of the arm 21 is movably connected with the lever 20, and the arm 22 is likewise connected with the lever 17. The opposite ends of the links 21 and 22 are connected with each other and the total system properly balanced. At the zero-position of the system the position of the upper turning points of the links 21 and 22 will coincide. When the lever 17 is deflected the upper turning point of the link 22 will be moved towards the right, and the distance between the upper pivots of the links 21, 22 will be proportionate to the speed pressure. The arrangement is operated as a lever, one arm of which is equal to the distance between the upper pivots of the said links and the other to the length of the link 22. If the upper pivot of the link 22 be retained by the lever 17 and the upper pivot of the link 21 be moved downwards by the force of the spring 23, the result will be a force directed towards the right from the common pivot of the two arms stretching the tension member 1 which in its turn will regulate the speed of the clock work mechanism.

Obviously, the arrangements according to Figs. 5, 6 and 6ª can also be combined with a water-, wind- or gas-meter based upon the Pitot or Venturi principle, in order to indicate the quantity of water, wind or gas passing through the said apparatus.

Fig. 7 shows a steam meter. In steam meters, working on the principle of the Pitot's tube or on the measuring of the pressure difference in a steam conduit on both sides of a throttle, the quantity of steam passing in every time unit is proportionate to $$\sqrt{(P_2-P_1) \cdot P_2 \cdot f(t)}$$

where $p_2$ and $p_1$ are the two measured pressures and $f(t)$ a function of the temperature. The steam pressures are conveyed to a differential pressure gauge 28, the piston or diaphragm of which exerts a tension in the wire 27 proportionate to the pressure difference $p_2-p_1$, while the other piston 29 exerts a pressure upon the lever 17, the moment of which is proportionate to the steam pressure $p_2$. The wire 27 is connected with the lever 20. The lever 17 is not directly connected with the link 22, but through a toggle lever 25, the apex of which is guided in a slot 26, so curved that the movement of the pivot of the link 22 guided in the slot 30 will be proportionate to $f(t) \cdot p_2$. Since the pressure $p_2$ is a function of the temperature, at least with saturated steam, the temperature can inversely be considered as a function of the pressure. $f(t) \cdot p_2$ will then be a new function $f^1(p_2)$. It is this new function, that will give the curvature of the slot 26, viz, the distance between the pivots of the links 21, 22 to be proportionate to $f^1(p_2)$, i. e. to $f(t) \cdot p_2$. As the link 21 is acted upon by a force proportionate to $p_2-p_1$, the tension member 1 will be acted upon by a force equal to $f(t) \cdot (p_2-p_1) \cdot p_2$. After a certain time the clock work mechanism will thus integrate the quantity of steam:

$$\int \sqrt{(p_2 - p_1) \cdot p_2 \cdot f(t)}.$$

In Fig. 8 a device for time integration of a certain quantity is shown, for instance the force exerted in any way. As a concrete example the force exerted by the electromagnet 31 of a continuous current meter may be considered. By means of a lever 32 the force is divided into two parts, one acting upon the arm 20, the other exerting a tension on the lever 17. The distance between the pivots of the links 21 and 22 and the force acting upon the upper end of the link 21 will both be proportionate to the force to be integrated. In consequence the tension in the tension member 1 will be proportionate to the square of the force affecting the device 31. Thus, the clock work mechanism will integrate as regards time the force exerted by the device 31, i. e., in this case the consumed quantity of electricity.

According to this new invention the product of a variable quantity and that of the square root of another variable quantity may be integrated as regards time. A case, where this can be applied is the testing of turbines. The effect of the turbine T (see Fig. 8$^a$) is equal to the product of the drop in pressure and the amount of fluid per time unit. Inserted in the supply tube of the turbine are a Pitot tube and a static tube P and S, respectively, and in the discharge tube a static pipe $S_1$. The pressure difference $S - S_1$ is equal to the drop in pressure. The amount of fluid per time unit will be proportionate to $$\sqrt{P - S}.$$

Thus the effect of the turbine will be equal to $$(S - S_1) \cdot \sqrt{P - S}.$$

If now the force P—S with the aid of a manometer or the like $m$ is caused to act directly or through gearing upon the tension member of a pendulum or balance 3 arranged according to this invention, the clock work mechanism will indicate the time integral of the drop in pressure. The clock work mechanism is arranged to drive, by means of bevel gears 60, 61 and a shaft 62, a cone $b$, which is in frictional engagement with the disk $c$. The position of this disc in relation to the apex of the cone is by a proper arrangement for instance a manometer $n$ made proportionate to the pressure difference $S - S_1$. The disc $c$ is through a gearing connected with counter $o$, which indicates the quantity of energy of the fluid passing through the turbine. The gearing 63 is connected by a rod 67 with the movable member 66 of the manometer $n$. Obviously, instead of the disc and cone any other known device for time integration may be used in combination with a clock work mechanism arranged according to this invention.

A modified form of the present clock work mechanism consists in an arrangement in which the force, tending to bring back to the position of equilibrium (rest) an oscillating pendulum, balance, or similar device and proportionate to the angle of oscillation, is made to act at a point, the position of which in relation to the pivot of said pendulum, balance, etc., is proportionate to the force to be integrated.

Fig. 9 shows a device having a flat spring, and Fig. 10 shows a similar device with a helical spring, both adapted for integration of a square root, while Fig. 11 shows a device adapted for direct time integration, where the distance of the reacting force from the point of oscillation and also the momentary increase of the force proportionate to the deflection from the position of equilibrium are proportionate to the quantity to be integrated.

In Fig. 9, 4 designates the escapement wheel of a clock work, and 3 the balance wheel, the position of equilibrium of which is determined by a toothed segment 5 turnable about the journal 34. In a member 2 secured to the segment 5 a slot 35 is arranged, guiding a journal connected with the flat spring 36. The spring 36 is secured to a sliding member 37 movable between suitable guiding pieces. The sliding member 37 is in the direction of the arrow, acted upon by the force, the square root of which is to be integrated. When this force equals zero, the journal of the flat spring is in line (concentric) with the journal 34. When the force is increased the spring 38 will be proportionally compressed, thereby causing the sliding member and consequently also the journal of the spring 36 to move a distance proportionate to the force. By this mechanism the journal will be placed at a distance from the axis of the oscillating member 5 proportionate to the quantity, the square root of which is to be integrated as regards the time. The reacting turning moment caused by the flat spring 36 on the balance will be proportionate to the said quantity, and the time of oscillation of the balance will be inversely proportionate to the square root of the said quantity. The clock work connected with the escapement wheel 4 will thus indicate the desired integral.

Fig. 10 shows a device combined with a water pressure meter and adapted for time integration of the square root of the water pressure. Such a combination may, for instance, be used, in the manner described above, by hydraulic logs, water and gas meters or similar devices. The pressure meter 16 acts on a lever 17 counteracted by a spring 18, which has no tension at the zero-position of the system. The lever 17 is provided with a slot 40, in which slides a journal 41 secured to a sliding member held in its middle position by the springs 39, 39. The journal 41 slides in the slot 35 of the segment 2, 5 and tends to move the said segment back to its position of equilibrium by a turning moment, the momentary increase of which is proportionate to the distance between the journals 41 and 34 measured in the direction of the slot. At the zero-position of the system the axes of the journals 41 and 34 are concentric. If, on the other hand, a pressure is created in the meter 16, the lever 17 and also the journal 41 will be moved in the slot 35 a distance proportionate to the water pressure. The momentary increase of the reacting turning moment as regards the axis 34 will also be proportionate to the water pressure, and the clock work is thus made to indicate the time integral of the square root of the water pressure.

According to Fig. 11, a journal 45 slides in the slot 35, said journal being connected not only with a spring 46 placed in the longitudinal direction of the slot but also with a tension member 47 acting in the same direction. The tension member 47, which may be elastic or non-elastic is connected to a sliding member 48 movable between the guides 49, and the sliding member 48 is acted upon by the force to be integrated. The tension of the tension member and that of the spring 46 will, consequently, be proportionate to the said force. Simultaneously, the spring 46 will be lengthened, and the journal 45 moved in the direction of the slot from its position of equilibrium to a point in line with the journal 34, this movement being proportionate to the force to be integrated as regards the time. If the journal is moved laterally, so that the members 46 and 47 will reach a position in line with each other the tension of the system tends to move the members 46, 47 back to such a position by a force, the momentary increase of which (tension divided by deflection) is proportionate to the force to be integrated. The segment 5 and also the balance 3 will be moved back to the position of equilibrium by a turning moment, the momentary increase of which is proportionate to the product of the tension acting on the journal 45 and the distance between the journals 45 and 34 i. e. proportionate to the square of the force to be integrated as regards the time. The clockwork will thus indicate the time integral of the said force.

Obviously, a double pendulum or any other oscillating device may be used instead of the balance wheel shown. The described invention may be used for any possible measuring purpose and combined with all the aforesaid or similar apparatuses.

Having now described my invention what I claim as new and desire to secure by Letters Patent is.

1. A clock work mechanism for mechanical time integration of the numerical values of a variable force comprising an oscillatable member, and tension means continually connected to such member and acting thereon to hold it to its position of equilibrium, the tension on said means being adapted to be varied proportionate to said force, whereby the time of oscillation of said member will be inversely proportionate to the square root of said force and the single clock work will directly indicate the time integral of a quantity proportionate to the square root of the force.

2. A clock work mechanism of the kind defined in claim 1 in which the device for acting upon the oscillating member comprises lever mechanism for transmitting a part of the force to the oscillating member.

3. A device as defined in claim 1 in which the force is transmitted by a Pitot tube to the oscillatable members.

4. A device as defined in claim 1 in which the force is transmitted by a diaphragm to a lever system and through the lever system to the oscillatable member.

5. An integrating device comprising an oscillatable member, tensioning means tending to bring said member to a position of rest, an escapement mechanism, and means for transmitting a force to said tensioning means to vary its tension on the oscillatable member to change its time period of oscillation proportionate to the square root of the quantity representing said force.

6. An integrating device comprising an oscillatable member, tensioning means tending to bring said member to a position of rest, an escapement mechanism, and means attached to a fixed point on the tensioning member for transmitting force thereto to vary its tension on the oscillatable member.

7. In a device for the mechanical time integration of the speed of a vessel, means responsive to the speed in proportion to the square of the speed of the vessel, an oscillatable member and clock mechanism under the control of the oscillatable member, and means connecting said speed responsive means with said oscillatable member to control the clock mechanism in proportion to the speed of the vessel.

In testimony whereof I have hereunto affixed my signature in presence of two witnesses.

HUGO ADAM WITT.

Witnesses:
AXAL EHRUER,
JACOB BAGGE.